Jan. 22, 1924.

F. LJUNGSTRÖM 1,481,720

TOOTHED GEARING

Filed Aug. 17, 1922

3 Sheets-Sheet 1

Inventor
F. Ljungström
By Macks & Clerk
Atty's

Jan. 22, 1924. 1,481,720
F. LJUNGSTRÖM
TOOTHED GEARING
Filed Aug. 17 1922  3 Sheets-Sheet 2
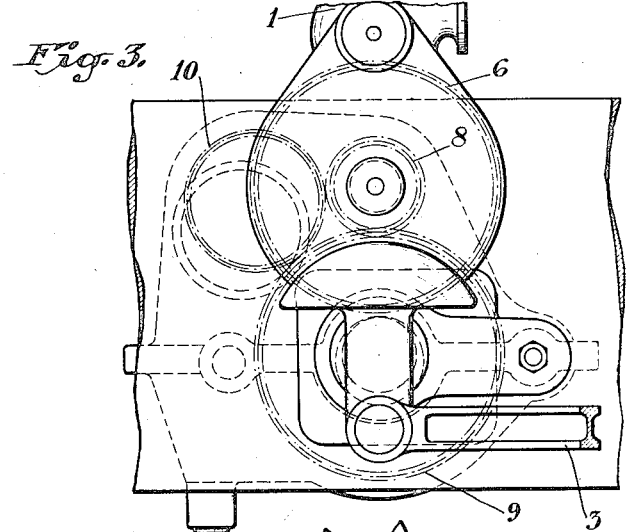
Fig. 3.
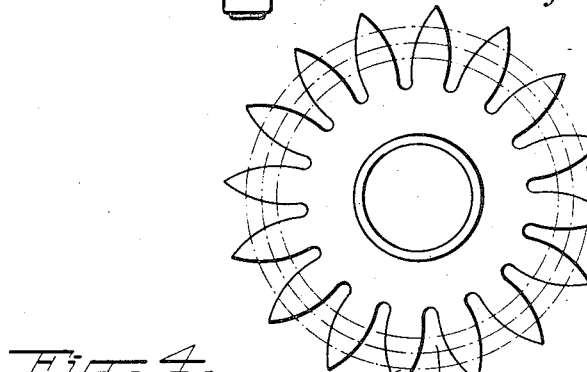
Fig. 4.
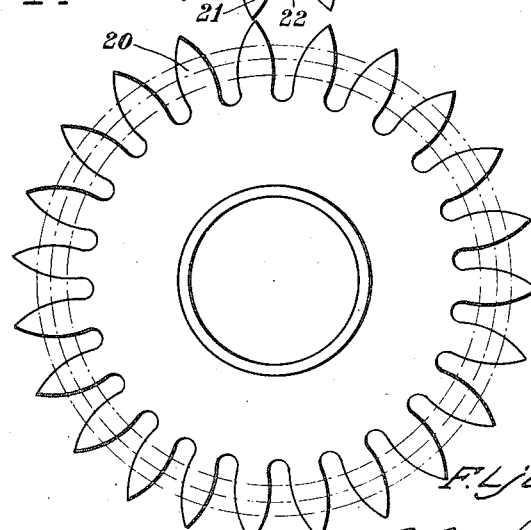
Inventor
F. Ljungström

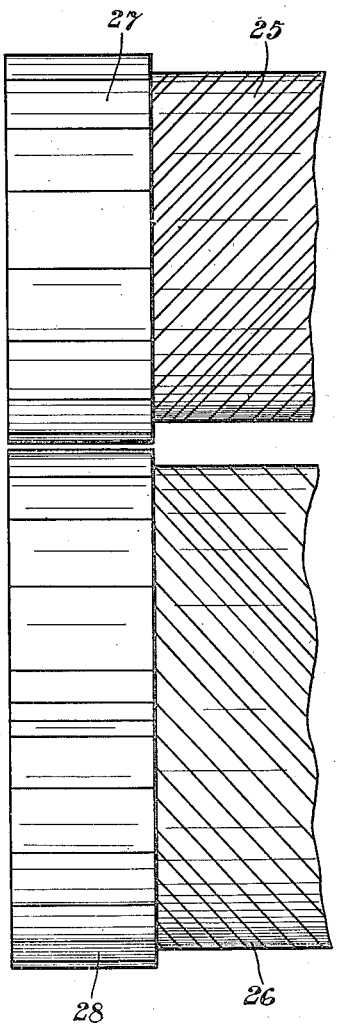
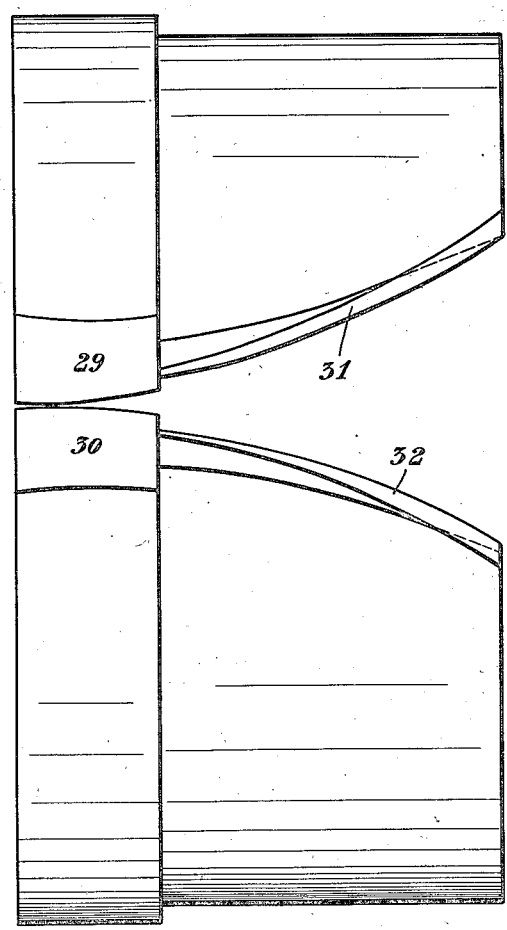

Patented Jan. 22, 1924.

1,481,720

UNITED STATES PATENT OFFICE.

FREDRIK LJUNGSTRÖM, OF LIDINGO-BREVIK, SWEDEN, ASSIGNOR TO AKTIEBOLAGET LJUNGSTRÖMS ANGTURBIN, OF STOCKHOLM, SWEDEN, A CORPORATION.

TOOTHED GEARING.

Application filed August 17, 1922. Serial No. 582,549.

*To all whom it may concern:*

Be it known that I, FREDRIK LJUNGSTRÖM, a subject of the King of Sweden, residing at Lidingo-Brevik, Sweden, have invented certain new and useful Improvements in Toothed Gearings, of which the following is a specification.

In toothed gearings comprising spur wheels it has previously been proposed to bring the toothed wheels intended for different purposes, as for instance for effecting backwards running or different ratio of transmission, into or out of engagement with one another by radial displacement of the wheels. In such case it has proved difficult to arrange the wheels of the toothed gearing in such manner in relation to each other that, when bringing two wheels together for engagement, a tooth space of the one wheel comes always right before a tooth top of the other wheel. To this purpose lever devices have been suggested turning either both wheels to correct angular position in relation to each other or only one of the wheels, until a tooth top of this wheel engages a tooth space of the other wheel. Such constructions are however voluminous and complicated, and the actuating of the levers is frequently made difficult by it being necessary that the movements required for the adjustment of the gearing be effected in a certain order by means of oil pressure in cylinders. In case of the spur wheels of the gearing being shew cut, further difficulties will arise, if a tooth top does not immediately engage a tooth space, since, as the tooth tops strike each other, the corresponding wheel shafts are at a distance apart which is less than the sum of the greatest radii of said toothed wheels. In such case the shafts of the toothed wheels have to be moved apart, before engagement can take place, which will cause large stresses on the teeth.

This invention has for its purpose to prevent said inconveniences and to facilitate the engagement of the toothed wheels. The invention consists in that the toothed wheels are provided with extra toothed rims preferably consisting of pointed or in other suitable manner shaped teeth, said toothed rims having larger outer diameter than the corresponding wheels and owing thereto being adapted, when the wheels are to be brought into engagement, to come first in contact thus turning the toothed wheels to a position fit for engagement.

Figure 1:
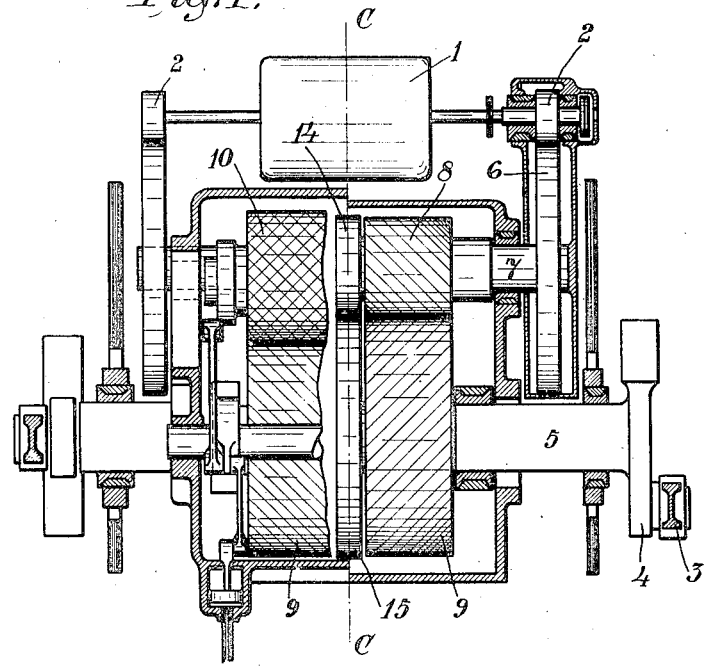
Figure 2:
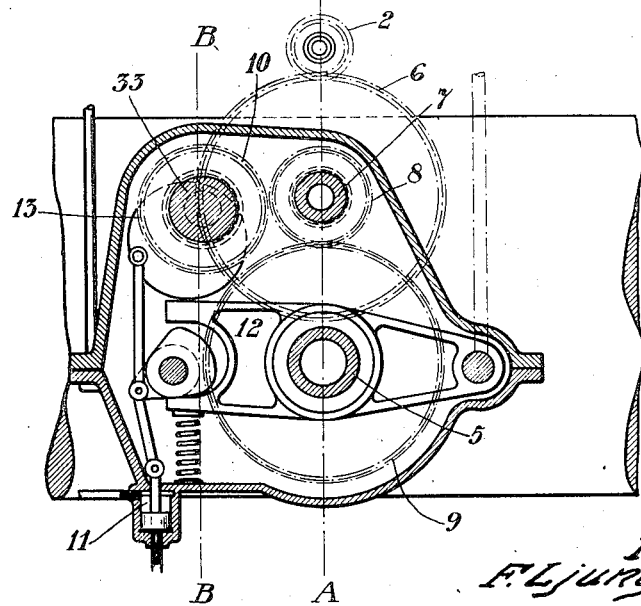

The invention is illustrated on the accompanying drawings. Figs. 1, 2 and 3 show diagrammatically a toothed gearing in which backwards running is obtained by engagement and disengagement of certain toothed wheels by radial adjustment of the same. Figs. 1 and 2 are sections in parallel to the shafts of the toothed gearing and at right angles to said shafts respectively. Fig. 3 is a side view of the toothed gearing. Fig. 4 show two toothed rims having teeth constructed according to the invention. Fig. 5 is a diagrammatic view of two spiral cut spur wheels provided with toothed rims constructed according to the invention. Fig. 6 illustrates a modified embodiment of the toothed rim.

In Fig. 1 the right part of which is a section through the gearing on line A—A and the left part of which is a section on line B—B in Fig. 2 and in Figs. 2 and 3 1 designates a driving engine actuating by means of toothed wheels 2 placed on either end of the engine shaft a known toothed gearing symmetric in relation to the line C—C and adapted for turbine driven locomotives having mechanical power transmitting device and in which the movement is transmitted to the driving wheels by means of coupling rods 3 from the last shaft 5 of the toothed gearing, said shaft being provided with a crank 4. The toothed wheels 2 actuate the toothed wheels 6, the shaft 7 and the toothed wheels 8. On forward running the toothed wheels 8 engage the toothed wheels 9 secured to the last shaft 5. The left part of Fig. 1 indicates the gearing adjusted for backward running, the toothed wheels 8 engaging extra toothed wheels 10 which at the same time are in engagement with the wheels 9 secured to the shaft 5. Said extra toothed wheels 10 are provided, in case of the gearing containing spur wheels having spiral cut teeth, provided with tooth spaces crossing each other, since they are intended for engagement with two toothed wheels cut in opposite directions.

To effect reversing to backward running oil is admitted to the cylinder 11, the frame work 12 together with the shaft 5 and the toothed wheels 9 being lowered so as to come out of engagement with the toothed wheels 8, and then the extra toothed wheels 10 are turned by means of the eccentric 13 to engagement with the wheels 8 and 9. In order to obtain correct engagement separate toothed rims 14 and 15 are mounted on the shafts 5 and 7 as well as on the shaft 33 supporting the extra toothed wheels 10 necessary for backward running, the outer diameters of said rims being a little larger than those of the corresponding toothed wheels and the rims being provided with teeth which by sliding on each other turn the corresponding toothed wheels to angular positions in which the latter when moving further towards each other come instantly in engagement. The toothed rim 15 may be common to both the toothed wheels 9 mounted on the same shaft 5. In case the teeth of the pinions be milled only after the toothed wheel blank has been shrunk onto an extension of the shaft, as is the case with the pinions 8, it may be suitable or necessary to construct the toothed rim in two or more parts which may be mounted about the shaft for instance between the two toothed wheels, after the toothed wheel has been ready milled.

Fig. 3 is a side view of the same toothed gearing mounted in a frame work appertaining to a locomotive.

Fig. 4 illustrates two toothed rims viewed from the side and separated from the toothed gearing. The toothed rims are so located in relation to each other that engagement by means of common teeth would not be unimaginable. Supporting said toothed rims to move towards each other, the tooth 20 will strike the tooth 21 and slide on its side so as to engage the tooth space 22. On account thereof the shafts of the toothed wheels will be turned through the same angle, the teeth of the real toothed wheels thereby being brought into engagement with each other. Preferably the teeth of the toothed rims are in the shape of common pointed teeth and, if desired, having increased height and provided with deepened tooth spaces so to be able to enter easily between each other. A preferred embodiment consists of a toothed rim having undercut teeth. The number of teeth of the toothed rims should preferably be equal to the number of teeth of the real toothed wheel secured to the same shaft, the first-named teeth constituting suitably an extension of the teeth of the real toothed wheels.

Fig. 5 illustrates two common spiral cut spur wheels 25 and 26 provided with separate toothed rims 27 and 28 respectively consisting of straight teeth. Even in this case the teeth of the toothed rims correspond suitably to the teeth of the real toothed wheels.

Fig. 6 illustrates a modified embodiment of the teeth of the toothed rims in which the latter are spiral cut and constitute extensions of the teeth of the real toothed wheels. In this figure all the teeth are supposed to be cut away with the exception of one tooth of each wheel. To bring the wheels into engagement, the two toothed rims 29 and 30 strike first each other and thereby the teeth 31 and 32 are adjusted to correct angular position in relation to each other.

The invention is described above in connection with a toothed gearing in which toothed wheels are brought into and out of engagement with each other in order to effect backward running by radial adjustment. The invention may however be also applied to toothed gearings of other type in which toothed wheels by radial adjustment are brought into and out of engagement in order to effect various ratio of transmission within the gearing. Likewise the invention is independent of the shape of the toothed rims or their location in the gearing.

What I claim as new and desire to secure by Letters Patent of the United States is:—

1. In toothed gearings, toothed wheels adapted, by radial adjustment in relation to each other, to be brought into and out of mutual engagement, toothed rims fixed coaxially on said wheels and having an outer diameter greater than that of the corresponding wheel and adapted, when the wheels are to be brought into engagement, to strike one another first and then to turn the toothed wheels into meshing relation.

2. In toothed gearings, toothed wheels adapted, by radial adjustment in relation to each other, to be brought into and out of mutual engagement, toothed rims fixed coaxially on said wheels and provided with pointed teeth and having an outer diameter greater than that of the corresponding wheel; whereby, when the wheels are to be brought into engagement, the toothed rims engage one another first and then turn the toothed wheels into positions meshing relation.

3. In toothed gearings, toothed wheels adapted, by radial adjustment in relation to each other, to be brought into and out of mutual engagement, toothed rims fixed coaxially on said wheels and provided with common teeth of increased height and with deepened tooth spaces and having an outer diameter greater than that of the corresponding wheel, said rims being by this means adapted, when the wheels are to be brought into engagement, to strike one another first and then to turn the toothed wheels into positions fit for engagement.

4. In toothed gearings, toothed wheels adapted, by radial adjustment in relation to each other, to be brought into and out of mutual engagement, toothed rims fixed coaxially on said wheels and having an outer diameter greater than that of the corresponding wheel, the teeth of said rims constituting an extension of the teeth of the corresponding wheel, said rims being by this means adapted, when the wheels are to be brought into engagement, to strike one another first and then to turn the toothed wheels into positions fit for engagement.

5. In toothed gearings, toothed wheels adapted, by radial adjustment in relation to each other, to be brought into and out of mutual engagement, toothed rims fixed coaxially on said wheels and having an outer diameter greater than that of the corresponding wheel, one rim being common to two wheels of the same magnitude mounted on the same shaft, said rims being by this means adapted, when the wheels are to be brought into engagement, to strike one another first and then to turn the toothed wheels into positions fit for engagement.

In testimony whereof I affix my signature in presence of two witnesses.

FREDRIK LJUNGSTRÖM.

Witnesses:
L. BERG V. SECIDE,
T. W. FALK.